United States Patent [19]

Fukuzawa et al.

[11] 4,319,398
[45] Mar. 16, 1982

[54] METHOD OF ASSEMBLING ROTOR OF STEPPING MOTOR

[75] Inventors: Koji Fukuzawa; Hideo Kawaguchi, both of Kashiwa, Japan

[73] Assignee: Oriental Motor Co., Ltd., Tokyo, Japan

[21] Appl. No.: 967,403

[22] Filed: Dec. 7, 1978

[30] Foreign Application Priority Data

Dec. 13, 1977 [JP] Japan .................................. 52/149622
Feb. 7, 1978 [JP] Japan .................................. 53/12574

[51] Int. Cl.³ ............................................. H02K 15/02
[52] U.S. Cl. .......................................... 29/598; 310/42
[58] Field of Search ................... 29/598, 596; 310/42, 310/156, 261, 264, 265

[56] References Cited

U.S. PATENT DOCUMENTS 3,601,640  8/1971  Egawa et al. .................. 310/156 X

*Primary Examiner*—Carl E. Hall

[57] ABSTRACT

The rotor of a stepping motor is formed of a shaft, a cylindrical magnet, first core pieces having an inside diameter substantially equal to the diameter of a rotor shaft and having a number of teeth on the periphery and second core pieces having an inside diameter substantially equal to the outside diameter of the magnet and having a peripheral contour similar to that of the first core pieces. A cylindrical jig is provided having ribs longitudinally formed on the inner peripheral wall which guide the teeth on the periphery of the ring-shaped core pieces. A predetermined number of the first and second ring-shaped core pieces are stacked in succession, in the bottom of the jig and one end portion of magnet is then fit into the hollow of the stack of core pieces. A spring member is applied over the magnet either before or after insertion and thereafter a predetermined number of the second pieces on the opposite end portion of the magnet and a predetermined number of the first core pieces are fit over the other end of the magnet. Finally the rotor shaft is forced through the stacked groups of core pieces and the magnet, thereby assembling the shaft, core pieces, and magnet together. The spring member exerts an axial bias on the core pieces. The assembly is then removed from the jig and a bonding agent applied thereon.

4 Claims, 13 Drawing Figures (III)

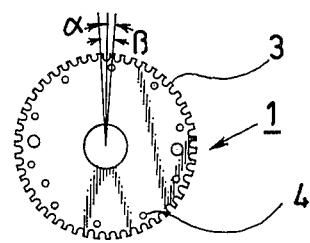
FIG. 1A
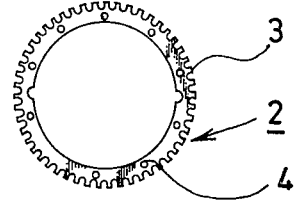
FIG. 1B
FIG. 3
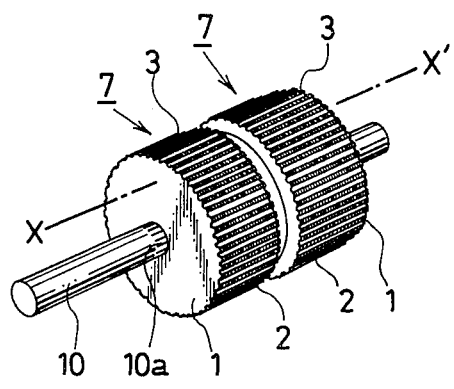
FIG. 6
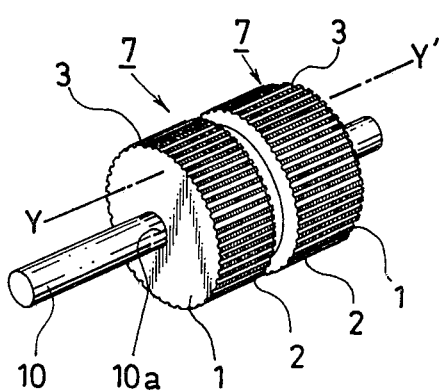

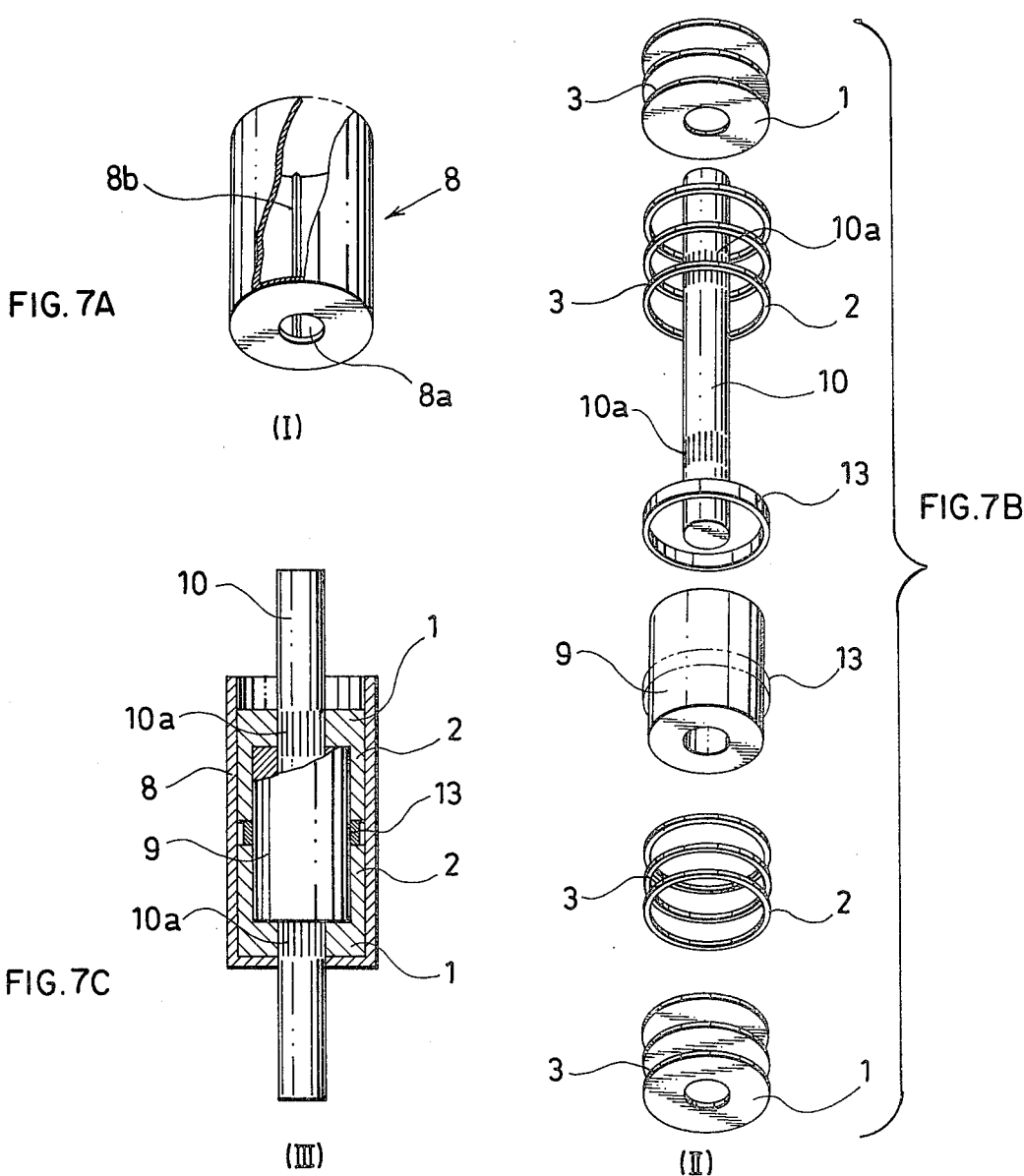

METHOD OF ASSEMBLING ROTOR OF STEPPING MOTOR

This invention relates to a method of assembling the rotor of a stepping motor.

The rotor of a stepping motor uses ring-shaped core pieces 1 and 2 as shown in FIG. 1(A) and FIG. 1(B) respectively. On the peripheries of these core pieces are formed a number of teeth, for example, 50 each, which are to constitute salient poles of the rotor as will be described later.

In building up a rotor from the core pieces, either of two methods has hitherto been employed. The first method will now be described with reference to FIG. 2. It comprises the following steps:

(1) In the first stage 2(I), the core pieces 1 and 2 are prepared in desired numbers (for example, seven core pieces 1 and 20 core pieces 2), and they are stacked up in order. During the stacking, the core pieces 1 and 2 in separate groups are placed one upon another with their teeth 3 oriented and aligned properly with guide pins 5 inserted through guide holes 4 formed in the pieces.

(2) Next, a cylindrical insert form 6, FIG. 2(II) consisting of a small-diameter portion 6a and a large-diameter portion 6b that correspond, respectively, to the different inside diameters of the core pieces 1 and 2, is forced into the stacks of the both core piece groups to press them intimately together (FIG. 2(III)).

(3) The core pieces in the groups are solidly bonded together by application of a suitable bonding agent.

(4) The insert form 6 is withdrawn from the solidly bonded core piece groups, leaving behind a cup-shaped core member 7 as indicated in FIG. 2(IV).

(5) Then, the cup-shaped core member 7 is placed in a jig 8 as shown in FIG. 2(V). The jig 8 is a hollow cylinder whose inside diameter is substantially equal to the common outside diameter of the core pieces 1 and 2. It has a hole 8a formed in the closed bottom for insertion of a rotor shaft 10 to be described later, and also has ribs 8b formed longitudinally on the inner wall. A magnet 9 is introduced into the hollow of the cup-shaped core member 7 within the jig 8. The magnet 9 is a solid cylinder equal in diameter to the large-diameter portion 6b of the insert form 6 and formed with a bore along the central axis for rotor shaft insertion.

After one end portion of the magnet 9 has been fitted tightly in the hollow of the core member 7, another core member 7 is fitted over the opposite end portion of the magnet, with the hollows of the two cups facing each other. Following this, a shaft 10, having a diameter equal to the inside diameter of the core pieces 1 and also having knurls 10a on suitable areas of the both end portions, is forced through both core members 7 and the magnet 9. As the core members 7 are led into the jig 8, they are guided with the ridges, formed of the teeth 3 on the peripheries of the core pieces shown in FIG. 1, in staggered engagement with the ribs 8b of the jig, so that the flutes are oriented together. In other words, the ribs of the core members are aligned longitudinally of the jig 8.

(6) Thus, the both core members 7, magnet 9, and shaft 10 are assembled to a unitary construction, and the product is taken out of the jig 8. A rotor is now complete as shown in FIG. 3.

The other conventional method of assembling a rotor with the aid of a set of jigs unlike the jig 8 will be described below.

In the second method, an upper jig 11 and a lower jig 12 as illustrated in FIG. 4 are employed. The upper jig 11 is a hollow cylinder having an inside diameter substantially equal to the common outside diameter of the core pieces 1 and 2, and formed with longitudinal ribs 11a on the inner wall and rectangular downward projections 11b at the lower end. On the other hand, the lower jig 12 consists of a cylindrical part 12' of the same diameter as the upper jig 11 and a bottom part 12'' adapted to fit in the lower portion of the cylindrical part 12'. The cylindrical part 12' has longitudinal ribs 12a formed on the inner wall and also has rectangular recesses 12b formed at the upper end to receive the downward projections 11b of the upper jig 11. The bottom part 12' has a bore 12c formed along its axis for insertion of the end portion of the rotor shaft to be described later.

The ribs 11a and 12a of the upper and lower jigs 11, 12 are so formed that, when the two jigs have been fitted together, the ribs are staggered by an angle which is an odd number times the angle $\alpha$ indicated in FIG. 1, i.e., by an angle $\frac{1}{2} \times (2n+1)$ (in which n=0, 1, 2 or so forth) times the angle $\beta$ that the teeth 3 on the peripheries of core pieces 1 or 2 constitute.

When assembling a rotor by means of the upper and lower jigs 4, 5, it is usually necessary to follow the steps given below:

(1)' In accordance with the steps (1) through (5) described above, a cup-shaped core member 7 is formed and is placed in the lower jig 12, with the hollow of the cup open upward as shown in FIG. 5.

(2)' One end portion of the cylinder magnet 9 is fitted into the hollow of the core member 7.

(3)' The upper jig 11 is placed on the lower jig 12, with the downward projections 11b mating with the recesses 12b as in FIG. 4.

(4)' Another core member 7 is fitted over the upper end portion of the magnet 9.

(5)' Next, the above-mentioned rotor shaft 10 having knurls 10a on suitable areas of the opposite end portions is forced axially through the both core members 7 and the cylindrical magnet 9.

(6)' The both core members 7 thus engage the knurls 10a while holding the magnet 9 in between, whereby the core members 7, magnet 9, and shaft 10 are integrally assembled together. The assembly is taken out of the jigs 11, 12, and a rotor of a stepping motor is now complete as shown in FIG. 6.

The teeth 3 on the peripheries of the core pieces 1 and 2 are superposed to form ridges or so-called salient poles of the rotor as indicated in FIG. 6. However, because the ribs 11a, 12a of the jigs 11, 12 are staggered by an angle an odd number times the angle $\alpha$, the axis Y of each salient pole of either core member 7 is naturally out of phase, by the same angle, with the axis Y' of the adjacent salient pole of the other core member 7. Here lies a different in construction of this rotor from the one assembled in accordance with the first method.

The two rotor-assembling methods of the prior art have posed the following problems:

(a) Many stages of work are involved in building up the rotor.

(b) Because two types of jigs (in the first method the insert form 6 and the jig 8, and in the second method the insert form 8 and the set of jigs 4, 5) are used, the accuracy of finishing the rotor is accordingly low. In either case the more or less inevitable errors in finishing of the two jigs combine to affect unfavorably the dimensional accuracy of the resulting rotor.

(c) The core member 7 formed to the shape shown in FIG. 2(IV) is coated with a bonding agent, in a layer not uniform in thickness. This makes it necessary for the upper jig 11 and the lower jig 12 to have a common inside diameter larger than the outside diameter of the core member 7 just by the thickness of the bonding agent layer, and also have the ribs 11a and 12a smaller in cross sectional area than the grooves to be formed of the teeth 3 of the core pieces 1 and 2 combined. In other words, jigs without strict dimensional accuracy have to be employed. There also arise problems of improper straightness of the axes of salient poles to be formed by the teeth 3 of the core pieces 1, 2, i.e., of the axes X, X' in FIG. 3 and the axes Y, Y' in FIG. 6, inaccurate alignment of the axes X, X', and low accruracy of the angle (α) that the axes Y, Y' make with each other. The alignment of the axes X, X' and the angle between the axes Y, Y' have material influences upon the characteristics of the stepping motor that incorporates the particular rotor.

In view of the foregoing disadvantages of the conventional assembling techniques, the present invention has for an object the provision of a method of assembling the rotor of a stepping motor which comprises fewer stages of work and permits attainment of higher accuracy of assembly than the ordinary methods.

Other objects and advantages of the invention will become apparent from the following description taken in conjunction with the accompanying drawings, wherein:

FIG. 1(A) and FIG. 1(B) are plan views of exemplary core pieces for use in the rotor of a stepping motor;

FIG. 3 is a perspective view of a rotor assembled so that the axes of salient poles of the core members are aligned;

FIG. 6 is a perspective view of a rotor assembled so that the axes of salient poles of the core members are staggered a predetermined angle from each other;

FIG. 7A is a perspective view of a jig employed in the method for forming a rotor according to the present invention;

FIG. 7B is an exploded view showing the associated parts of the rotor of the present invention;

FIG. 7C is a sectional view through the assembled parts of FIG. 7B and jig of FIG. 7A.

Figures 2, 2A:
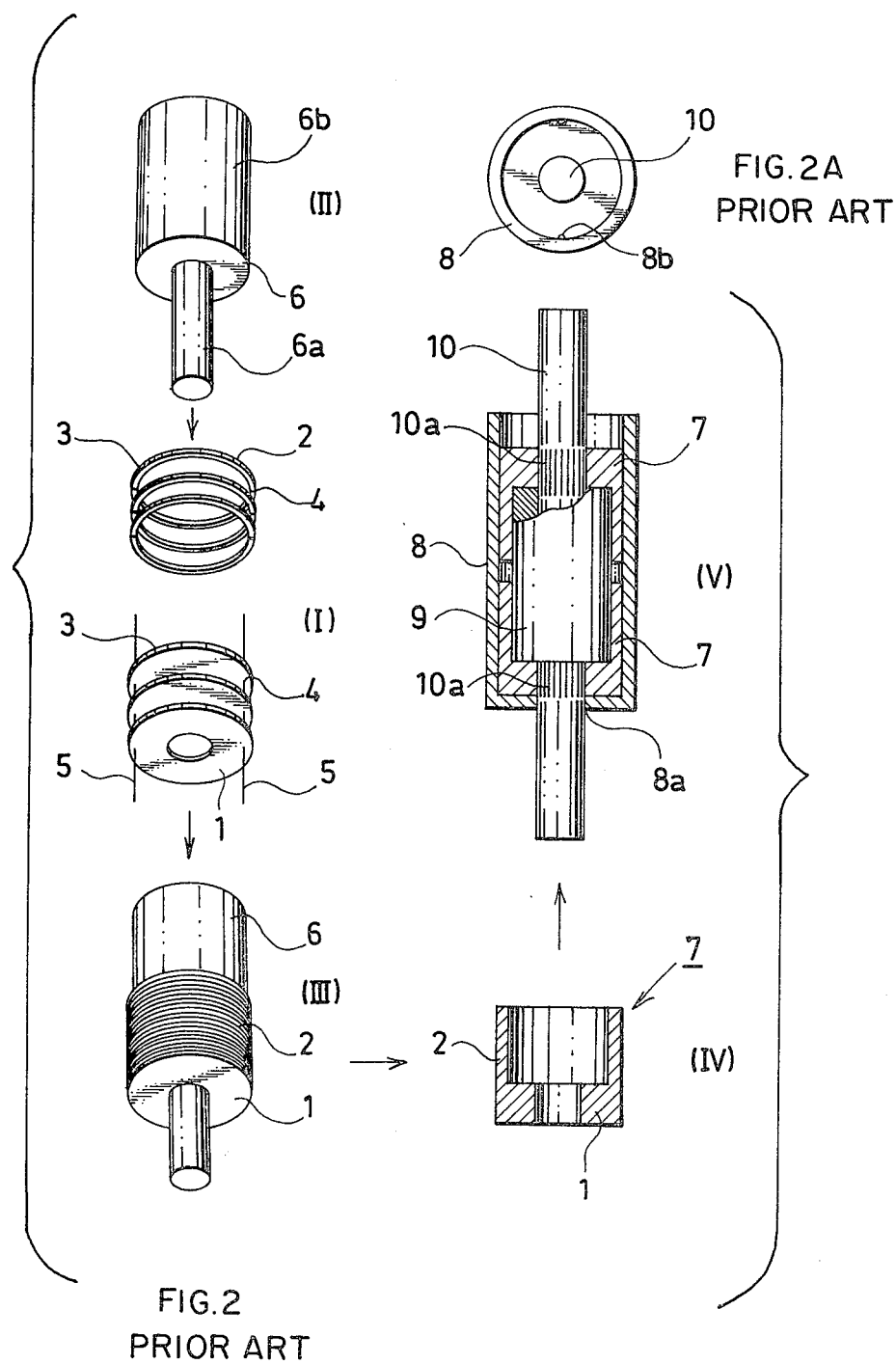
FIG. 2 is an exploded view illustrating the sequential steps (I) to (V) in a conventional method of assembling a rotor.
FIG. 2A is a plan view of the rotor shown in FIG. 2.

In the method of assembling a rotor in accordance with the invention, the jig 8 shown in FIG. 7(I) is loaded with rotor components in the order indicated in FIG. 7(II). First, on the inner bottom of the jig 8, for example, seven core pieces 1 of the structure shown in FIG. 1(I) and then, for example, 20 core pieces 2 of the structure in FIG. 1(II) are stacked up (although three pieces each are here shown for the sake of simplicity). During this stacking, the teeth 3 of the core pieces 1 and 2 in two groups are guided into alignment by the inner ribs 8b of the jib 8. Next, the lower end portion of the cylindrical magnet 9 is introduced into the hollow defined by the two groups of core pieces 1, 2, and a ring 13 of silicon rubber or other elastic material is fitted around the middle portion of the magnet 9. Alternatively, the ring 13 may be fitted over the magnet 9 prior to the introduction into the jig. Along the inner wall of the jig 8, 20 core pieces 2 are fitted, in succession, over the upper end portion of the magnet 9, and then seven core pieces 1 are piled up over the group of core pieces 2. Since the teeth 3 of the core pieces 1, 2 in the two groups are guided by the ribs 8b during the course of stacking, the teeth are completely matched with those of the lower groups of core pieces 1, 2 previously stacked up. Thus, the teeth 3 of the core piece groups are all aligned in ridge-like fashion longitudinally of the jig 8.

The length of the cylindrical magnet 9 is slightly less than the total overall stack thickness of the upper and lower core piece groups 2 plus the thickness of the ring 13. That is to say, the length of each core piece group 2 is such that it can be sandwiched with pressure between the associated core piece group 1 and the ring 13.

Lastly, the shaft 10 knurled at 10a on both end portions is forced through the center hole of the core piece group 1 and the bore of the magnet 9 (FIG. 7(III)). The ring 13 of elastic material is thus intensely compressed between the two core piece groups 2, and the center hole of the core piece group 1 is securely engaged with the shaft 10 by means of the knurlings 10a. The core piece groups 2 are pressed against the associated groups 1 by the repulsive force of the ring 13.

At this point of time, the product built up of the rotor components assembled in the manner described is drawn out of the jig 8. A rotor assembly as shown in FIG. 3 is now obtained. The core piece groups 2, held in position by the springback of the ring 13, has no danger of their ridges formed of the superposed teeth 3 being disturbed out of their proper alignment.

As the final finish, the rotor assembly is coated with a bonding agent in the usual manner. The components are then completely bonded together to make up a rotor of unitary construction.

Figure 4:
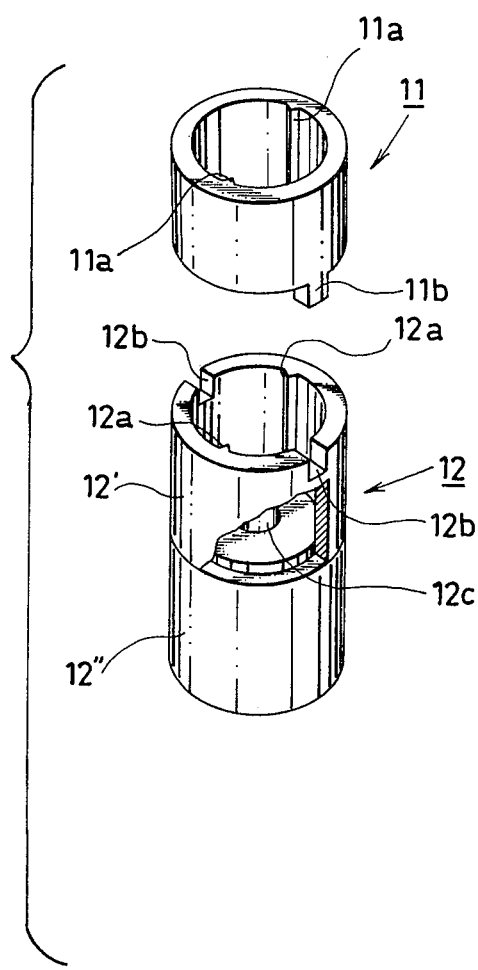
FIG. 4 is an exploded view of a set of jigs employed in another conventional method of assembling the rotor.
Figure 5:
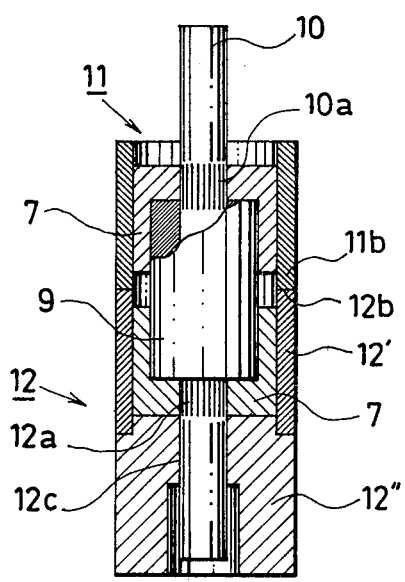
FIG. 5 is a partly sectional view of a rotor as assembled with the set of jigs shown in FIG. 4.

Next, another procedure of assembling a rotor by use of the jig of FIG. 4 in accordance with the invention will be described.

Figure 8:
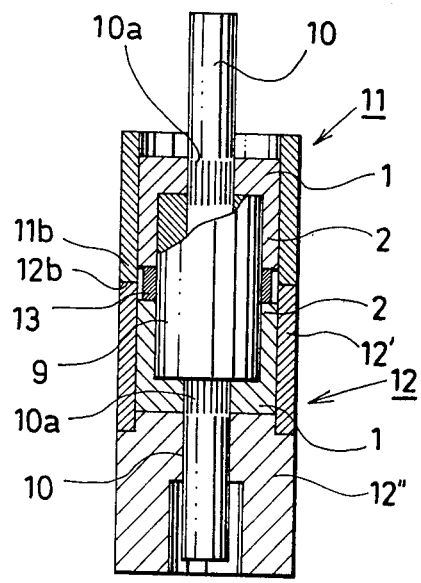
FIG. 8 is a partly sectional view of a rotor assembled by using the set of jigs shown in FIG. 4 in a modified way according to the invention.

In this case, for example, seven core pieces 1 shown in FIG. 1(I) and then, for example, 20 core pieces 2 in FIG. 1(II) are stacked up, as illustrated in FIG. 8, on the bottom part 12" of the lower jig 12. The teeth 3 of the core pieces 1, 2 in the two groups are guided by the ribs 12a of the lower jig 12 and are superposed in alignment.

Following this, the lower end portion of the cylindrical magnet 9 is introduced into the hollow defined by the two groups of core pieces so stacked up, and the ring 13 of silicon rubber or other elastic material is fitted over the middle portion of the magnet 9. The ring 13 may be fitted beforehand over the magnet.

The upper jig 11 is placed on the lower jig 12, with its downward projections 11b seated in the corresponding recesses 12b of the lower jig. Twenty core pieces 2 are fitted, in succession, over the upper end portion of the magnet, with their teeth guided by the inner ribs 11a of the upper jig 11, and seven core pieces 1 are stacked up over the group of core pieces 2. The shaft 10 is then forced through the center hole of the core piece group 1 and the bore of the magnet 9. The ring 13 of elastic material is tightly pressed between the core piece groups 2, and the center holes of the other core piece groups 1 are securely engaged with the shaft 10 by means of the knurlings 10a on the shaft 10. The core piece groups 2 are pressed against the associated core piece groups 1 by the springback of the ring 13.

The assembly of rotor components thus put together is drawn out of the jigs 11, 12, and a rotor as shown in FIG. 6 is obtained. The core piece groups 1, 2 are held in place by the springback of the ring 13, and there is no possibility of their superposed teeth 3 being loosened out of alignment.

The rotor assembly thus obtained is conventionally coated with a bonding agent so that the components are solidly joined together, and a complete rotor results.

Figure 9:
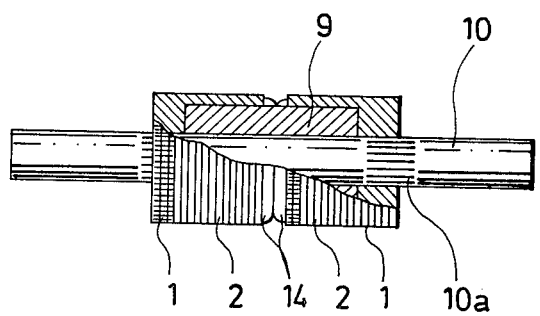
FIG. 9 is a partly longitudinal sectional view of a rotor provided with a ring consisting of Belleville springs.

While the embodiments of the invention have so far been described as using a single rubber ring, it may be replaced by any other suitable means, for example, by a pair of Belleville springs 14 held bottom to bottom as shown in FIG. 9.

As described above, the present invention renders it possible to assemble the rotor of a stepping motor easily by means of a single jig or a set of jigs. The invention permits omission of the step of the conventional assembling methods in which cup-shaped core members 7 have to be formed with the aid of the insert form 6. Moreover, because the bonding agent is applied after the rotor has been assembled, jigs of higher dimensional accuracy than those used in the prior art methods of assembling may be employed. Consequently, the straightline accuracy of the ridges formed of the teeth of core piece groups, i.e., of the axes X, X' and Y, Y' in FIGS. 3 and 6, alignment of the axes X, X' and the accuracy of the angle ($\alpha$) the axes Y, Y' make relative to each other, that have material bearings upon the characteristics of the stepping motor, can be improved altogether.

With the features described, the method of the invention makes possible the manufacture of the rotor of a stepping motor with high precision in a simplified procedure for assembling, and therefore the method lends itself optimumly to the quantity production of rotors of the type.

We claim:

1. In a method of assembling the rotor of a stepping motor by stacking up predetermined numbers of first and second ring-shaped core pieces to form cup-shaped core members, said first core pieces having an inside diameter substantially equal to the diameter of the rotor shaft and formed with a number of teeth on the periphery, said second pieces having an inside diameter substantially equal to the outside diameter of a cylindrical magnet to be mounted on said shaft and also having a peripheral contour similar to that of said first core pieces, and then fitting said cup-shaped core members over the both end portions of said magnet, the improvement which comprises the steps of providing a jig of a bottomed cylindrical contour having ribs longitudinally formed on the inner peripheral wall for guiding the teeth on the peripheries of said ring-shaped core pieces and also having a hole formed in the bottom center for insertion of said rotor shaft, stacking up predetermined numbers of said first and second ring-shaped core pieces, in succession, on the inner bottom of said jig, fitting one end portion of said cylindrical magnet into the hollow of a cup-like stack of the both core piece groups, and fitting a ring of elastic material over said magnet, fitting and stacking up a predetermined number of said second core pieces on the opposite end portion of said magnet and then stacking thereon a predetermined number of said first core pieces, forcing a rotor shaft through said stacked groups of core pieces and said cylindrical magnet, thereby integrally assembling said shaft, core piece groups, and magnet all together, and thereafter taking out the assembly from said jig and applying a bonding agent thereon.

2. The method according to claim 1, in which said jig consists of an upper jig and a lower jig, each having ribs formed longitudinally on the inner peripheral wall for guiding the teeth on the periphery of each said ring-shaped core piece, and said upper and lower jigs in use are engage in such a manner that their ribs are staggered by an angle $\frac{1}{2} \times (2n+1)$ (in which n=0, 1, 2 or so forth) times the angle that each two teeth on the periphery of each said core piece make to each other, with said first and second ring-shaped core pieces being stacked within said jigs for assembly.

3. The method according to claim 1, wherein said elastic ring is applied to said magnet prior to the fitting of the one end portion of the magnet into the hollow of the cup like stack.

4. The method according to claim 1, wherein said elastic ring is applied to said magnet subsequent to the fitting of the one end portion of the magnet into the hollow of the cup like stack.

* * * * *